US006171564B1

(12) United States Patent
Jones (10) Patent No.: US 6,171,564 B1
(45) Date of Patent: Jan. 9, 2001

(54) PROCESS FOR EXTRACTION OF METAL FROM AN ORE OR CONCENTRATE CONTAINING NICKEL AND/OR COBALT

(75) Inventor: David L. Jones, Delta (CA)

(73) Assignee: Cominco Engineering Services Ltd., Vancouver (*) Notice: Under 35 U.S.C. 154(b), the term of this patent shall be extended for 0 days.

(21) Appl. No.: 09/134,086

(22) Filed: Aug. 14, 1998

Related U.S. Application Data (63) Continuation-in-part of application No. 08/911,797, filed on Aug. 15, 1997, now abandoned.

(51) Int. Cl.⁷ .......................... C22B 23/00; C22B 19/00; C22B 15/00
(52) U.S. Cl. .................. 423/140; 423/150.1; 423/24; 423/27; 423/99; 423/109; 423/139
(58) Field of Search .................. 423/150.1, 140–147, 423/109, 139, 34–37, 101–106, 24, 38, 99, 41, 27

(56) References Cited

U.S. PATENT DOCUMENTS

| 3,466,144 | * | 9/1969 | Kay | 423/147 |
|---|---|---|---|---|
| 3,798,304 | * | 3/1974 | Weston | 423/150.1 |
| 4,039,406 | | 8/1977 | Stanley et al. . | |
| 4,044,096 | * | 8/1977 | Queneau et al. | 423/142 |
| 4,338,168 | | 7/1982 | Stanley et al. . | |
| 4,410,498 | * | 10/1983 | Hatch et al. | 423/146 |
| 4,431,613 | * | 2/1984 | Verbaan | 423/147 |
| 4,435,369 | * | 3/1984 | Simpson | 423/147 |
| 4,594,102 | * | 6/1986 | Weir et al. | 423/141 |
| 5,650,057 | * | 7/1997 | Jones | 423/150.1 |
| 5,855,858 | * | 1/1999 | Jones | 423/150.1 |

FOREIGN PATENT DOCUMENTS

WO 96/19593  6/1996  (WO) .

OTHER PUBLICATIONS

Paper entitled "A Hydrometallurgical Conversion Process For The Treatment of Copper Concentrate", Authors: R.W. Stanley et al of the Noranda Research Centre, Presented at the 21st Annual CIM Conference of Metallurgists, Toronto, Canada, Aug. 29–Sep. 1, 1982.

* cited by examiner

Primary Examiner—Steven Bos
(74) Attorney, Agent, or Firm—Elbie R. de Kock (57) ABSTRACT

A process for the extraction of metal from an ore or concentrate which contains nickel and/or cobalt values and other metals, comprises subjecting the ore or concentrate to acid leaching under pressure at $pH \leq 2$ to obtain a liquor containing nickel and/or cobalt values, subjecting the liquor to a first precipitation stage at pH of about 5 to 6 to produce a solid containing non nickel and non cobalt metals and a resultant solution containing the nickel and/or cobalt values and subjecting the resultant solution to a second precipitation stage at a pH of about 7 to 8 to produce a solid containing nickel and/or cobalt.

34 Claims, 6 Drawing Sheets

PROCESS FOR EXTRACTION OF METAL FROM AN ORE OR CONCENTRATE CONTAINING NICKEL AND/OR COBALT

CROSS REFERENCE TO RELATED APPLICATIONS

This application is a continuation-in-part of U.S. patent application Ser. No. 08/911,797 filed August 15, 1997, now abandoned the entire contents of which is incorporated herein by reference.

FIELD OF THE INVENTION

This invention relates to the hydrometallurgical treatment of sulphide ores or concentrates or laterite ores for the extraction of nickel, cobalt and other metals therefrom.

BACKGROUND OF THE INVENTION

Nickel sulphide ores are presently treated in commercial applications in a variety of processes in which the first step normally is physical concentration by means of flotation to upgrade the nickel content, typically from an initial range of between 0.5% and 2.0% to a concentrated range of between 7 and 25% nickel. This concentrate is then subsequently treated by pyrometallurgical (smelting) methods to produce a nickel matte or an artificial high grade sulphite product containing about 20% to 75% nickel. The matte is then subjected to hydrometallurgical treatment to produce a nickel product.

This combination of pyrometallurgical and hydrometallurgical processing of nickel concentrates is well established commercially with a number of variations, particularly in the hydrometallurgical part. Most processes recover some portion of the associated metal values where present, such as copper and cobalt. In addition, a leach residue containing precious metals, such as gold and silver, as well as platinum group elements, e.g. platinum and palladium, is often produced for subsequent recovery of contained values.

The hydrometallurgical steps for treating nickel matte vary considerably but all known commercial processes have one or more of the following disadvantages:

(i) High costs of reagents such as caustic soda or ammonia, required for neutralization.

(ii) Large byproduct production, such as ammonium sulphate or sodium sulphate, which are difficult to market.

(iii) High energy costs due to large temperature changes during the process.

(iv) Complex and costly process flowsheet, leading to high capital and operating costs.

As an alternative to the established pyrometallurgical/hydrometallurgical route referred to above, there is one known process using wholly hydrometallurgical steps that treats concentrates without smelting. It comprises a pressure leaching stage with ammoniacal solution. This avoids most of the disadvantages associated with the smelting processes, but still suffers from all of the listed disadvantages of the known hydrometallurgical routes, and in fact, is not even as efficient overall as the best of the pyrometallurgical/hydrometallurgical routes.

The present invention provides a process for the hydrometallurgical extraction of copper, nickel and cobalt as well as other metals from sulphide ores. It also provides a process for the hydrometallurgical extraction of nickel and cobalt from laterite ores.

Existing hydrometallurgical processes for laterites also suffer from the above disadvantages, in particular, poor or costly recovery of cobalt. It is accordingly a further object of the invention to provide a process resulting in high recovery of cobalt and nickel at a low cost from liquors resulting from the acid leaching of laterites.

SUMMARY OF THE INVENTION

According to the invention there is provided a process for the extraction of metal from an ore or concentrate, containing nickel and/or cobalt values and other metals, comprising the steps of subjecting the ore or concentrate to acid leaching under pressure, at $pH \leq 2$, to obtain a liquor containing nickel and/or cobalt values in addition to non-nickel and non-cobalt metals from the resultant pressure oxidation slurry; subjecting the liquor to a first precipitation stage at a pH of about 5 to 6 to produce a solid containing the non-nickel and non-cobalt metals and a resultant solution containing the nickel and/or cobalt values; subjecting the resultant solution to a second precipitation stage at a pH of about 7 to 8 to produce a solid containing nickel and/or cobalt and a nickel and cobalt depleted liquor.

Further objects and advantages of the invention will become apparent from the description of preferred embodiments of the invention below.

DETAILED DESCRIPTIONS OF THE PREFERRED EMBODIMENTS

The process is particularly suitable for the treatment of low grade, i.e. high iron content, sulphide ores or concentrates that produce large amounts of acid during pressure oxidation. The ores may contain nickel and/or cobalt, with or without copper, or only copper without nickel or cobalt. As stated above, the process is also suitable for the treatment of laterite ores.

Figure 1A:
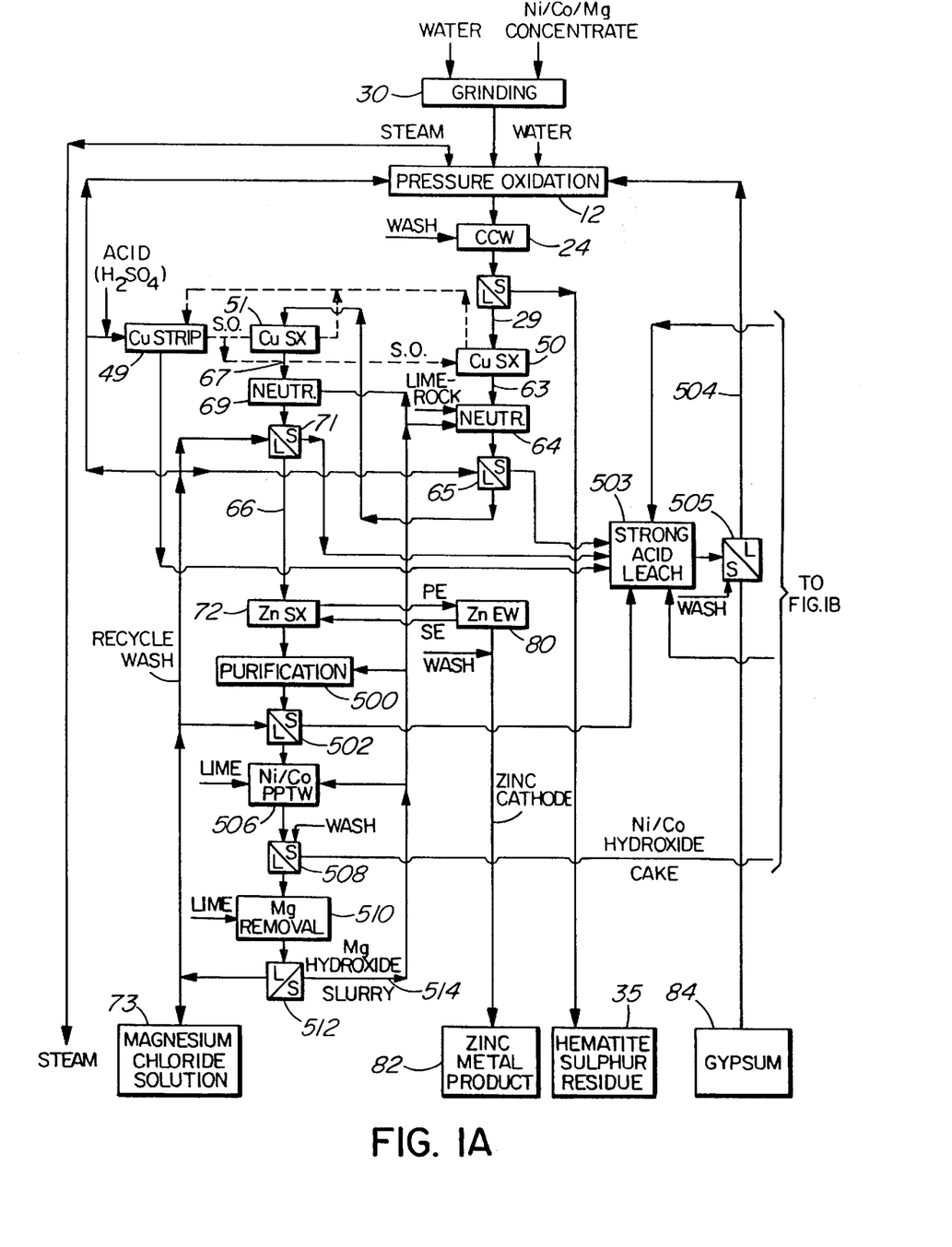
FIG. 1 is a flow diagram of a hydrometallurgical metal extraction process according to the invention.
Figure 1B:
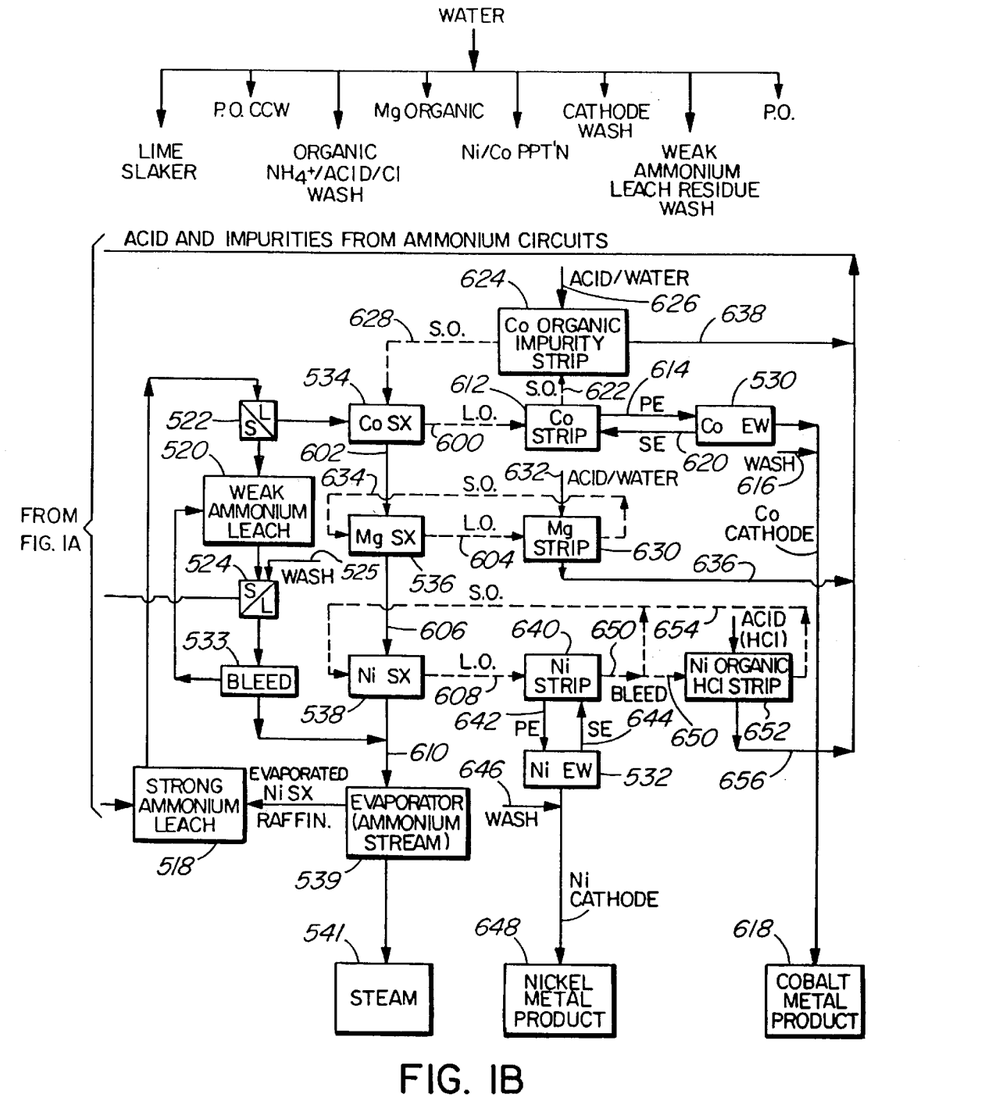

The ore concentrate is first subject to grinding, as indicated at 30 in FIG. 1, to reduce the particle size. Water is added to produce a slurry, which, in the case of a sulphide ore or concentrate, is then subjected to pressure oxidation 12 in an autoclave in the presence of an acidic solution containing sulphate, chloride and, preferably copper ions.

The amount of $H_2SO_4$ introduced into the autoclave is sufficient to allow the pH of the solution in the autoclave to go below a value of 2, preferably 1.5 to 1. The concentration of chloride in solution is maintained at about 8 to 20 g/l, preferably 12 g/l. The highest temperature reached in the autoclave is about 120° C. to about 175° C., preferably 130° C. to about 160° C., i.e. above the melting point of elemental sulphur. The partial pressure of oxygen is between 50 psig and 100 psig which is about 100 to 300 psig combined steam and oxygen pressure. It is understood, however, that with continuous operation and using an autoclave with multiple compartments that is fed with a relatively cool feed, e.g. about 40° C., the first one or two compartments will be cooler by 10° C. to 25° C. than the hottest compartments.

The retention time is about 0.5 to 5.0 hours, depending inversely on temperature. The process is normally carried out in a continuous fashion in the autoclave but the process can also be carried out in a batch wise fashion, if desired.

At the low pH (pH 1.5 to 1), all the nickel/cobalt and other metal values such as copper and zinc, if present, are leached into the liquid phase during pressure oxidation 12 and practically none goes into the solid phase in the form of the basic solid salts, such as basic copper sulphate, although there is entrained liquor associated with the solids after filtration.

After pressure oxidation 12, the slurry, still at a low pH of 1.5 to 1, is cooled as quickly as possible to a temperature of about 90° C. to 100° C., i.e. below the melting point of elemental sulphur. This is achieved by discharge into a flash tank 22 so as to also lower the pressure to atmospheric pressure.

One of the reasons for the quick cooling is to counteract the reverse reaction:

$$Ni + S^0 \rightarrow NiS$$

from occurring, when the reaction mixture is no longer subjected to the oxygen presence in the autoclave. It has been found that this reaction also takes place for copper. It is important to counteract these reverse reactions to minimize the losses of these metals to the solid phase remaining after pressure oxidation 12.

Figure 3:
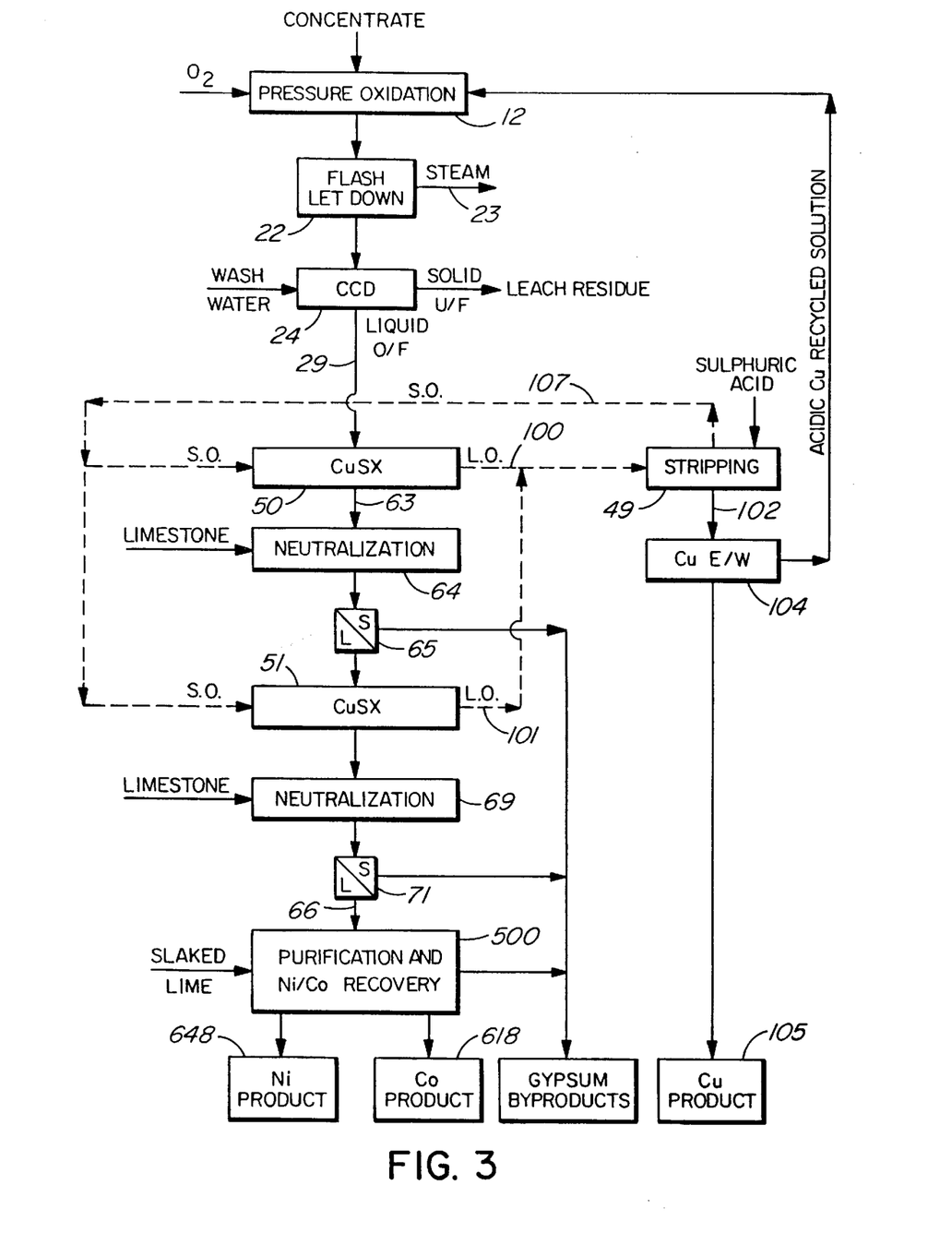
FIG. 3 is a flow diagram showing detail of the copper solvent extraction steps of the process of FIG. 2.
Figure 4:
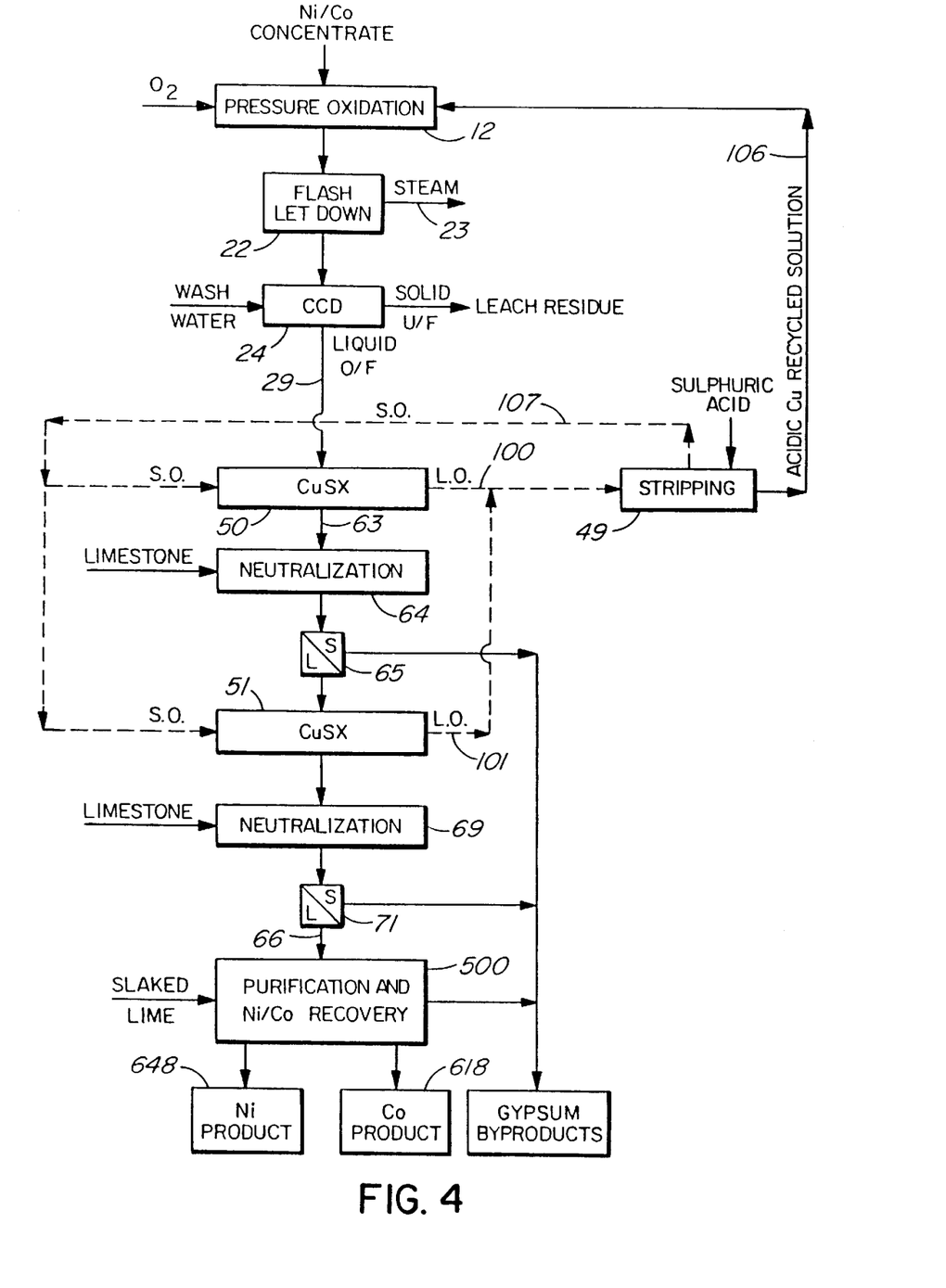
FIG. 4 is a flow diagram showing detail of the process of FIG. 1 for the treatment of nickel/cobalt ores.

Steam is released from the flash tank 22, as indicated at 23 in FIGS. 3 and 4. The slurry is then cooled further to about 40° C. by evaporative cooling in cooling towers (not shown) which also aids in maintaining the water balance in the system. The cooling is effected in two stages, with the temperature at the end of the first stage at about 55° C.–65° C. In order to achieve the cooling, the slurry is first passed through a thickener (not shown). The liquid overflow from the thickener is passed through the cooling towers and the cooled liquid is then thereafter rejoined by the liquid.

The cooled slurry is then subjected to a liquid/solid separation 24, which, in the present example comprises a counter-current decantation (CCD) circuit to produce a pressure oxidation filtrate 29 and a solid residue 35 (pressure oxidation filter cake), which comprises mostly of hematite and elemental sulphur. If the concentrate also contains precious metals, these will also be contained in the solid residue 35 and the residue 35 can be further treated to extract these metals prior to discarding.

Figure 2:
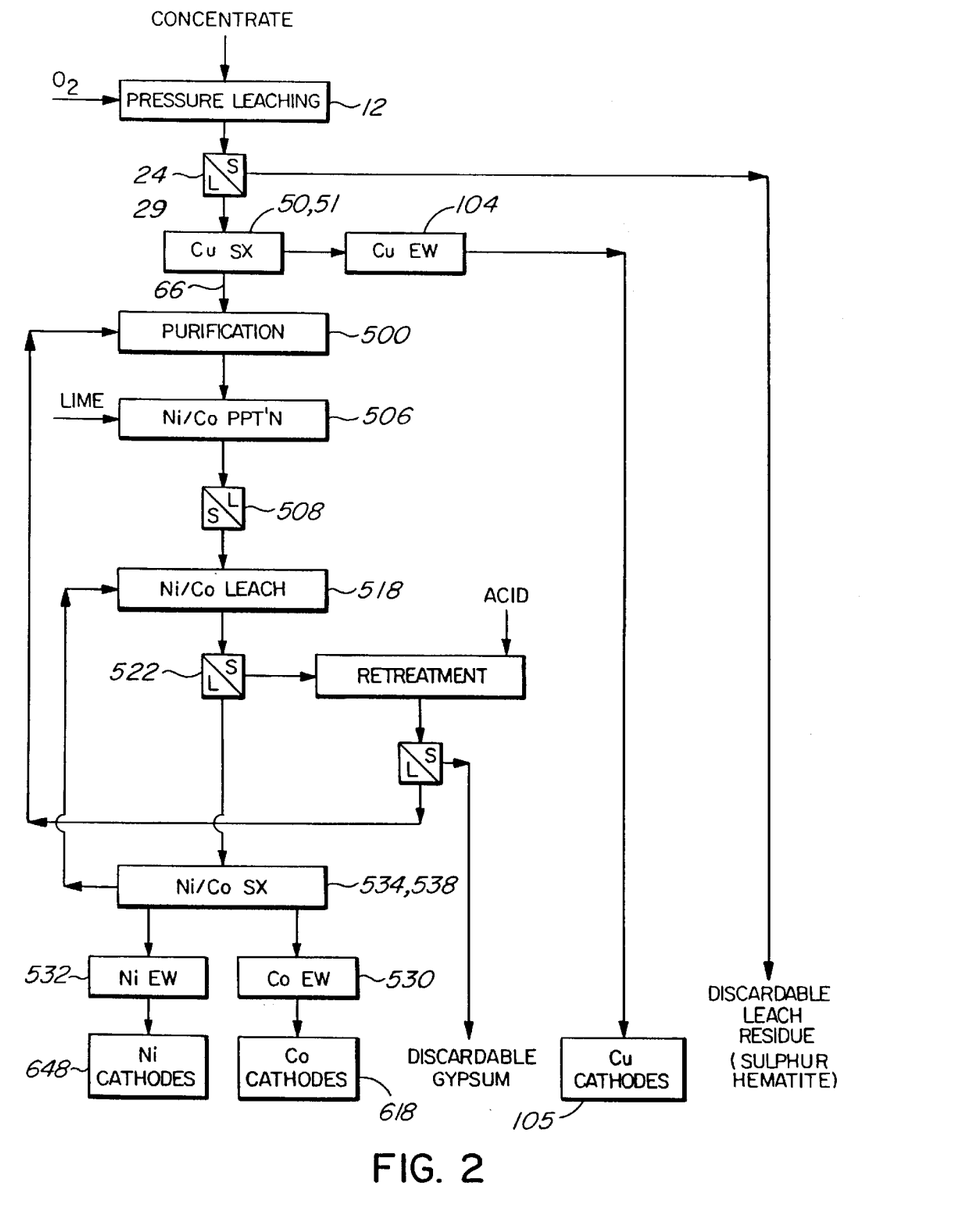
FIG. 2 is a flow diagram showing detail of the process of FIG. 1 for the treatment of nickel/cobalt/copper ores.

The pressure oxidation filtrate 29 is subjected to copper solvent extraction to reduce the [$Cu^{2+}$] in the resulting raffinate, as much as possible, preferably to less than 100 ppm. The solvent extraction may be effected to remove copper as an impurity or to remove copper as product, if significant copper values are present in the original concentrate, as shown in FIG. 2.

In order to achieve the low copper concentration in the final raffinate, the filtrate 29 is in effect subjected to two stages of copper solvent extraction with a neutralization step in between.

Thus, the pressure oxidation filtrate 29 is subjected to a first copper solvent extraction 50 to produce a raffinate 63. The raffinate 63 is subjected to neutralization 64 with lime rock to raise the pH to about pH 2 to produce a liquid and a solid which is separated at 65. The liquid is then subjected to a second copper solvent extraction 51 to produce a further raffinate 67 with a copper concentration of about 100 ppm or less. The raffinate 67 is neutralized at 69 to a pH of about 2 and then subjected to a liquid/solid separation 71 to produce a copper depleted raffinate 66, which can be further treated for nickel/cobalt extraction, as will be described below.

The copper solvent extractions 50 and 51 are shown in more detail in FIGS. 3 and 4.

The loaded extractants 100 and 101 from the solvent extractions 50 and 51, respectively, are combined and subjected to washing with water (not shown) and then stripping 49 with sulphuric acid. The resulting copper solution 102 is subjected to electrowinning 104 to produce a copper product 105, as shown in FIG. 3. The stripped organic 107 is recycled to the solvent extractions 50 and 51.

Any suitable copper extractant which is capable of selectively removing copper from an acid solution also containing nickel/cobalt/zinc/iron may be used. An extractant which is found to be suitable is a hydroxy-oxime, such as LIX 84™ or LIX 864™ reagents from Henkel Corporation, or a combination of these reagents.

If no significant copper values are present in the ore or concentrate, as is the case with the process of FIG. 4, it is nevertheless beneficial to carry out the pressure oxidation 12 in the presence of copper ions, e.g. 5 to 10 g/l copper. Copper ions can be added initially in the form of a copper salt, such as $CuSO_4$ or $CuCl_2$. Thereafter, the copper solvent extractions 50, 51 and stripping 49 are still carried out but the electrowinning 104 is omitted and the pregnant copper liquor resulting from the stripping 49 is recycled to the pressure oxidation 12, as shown at 106 in FIG. 4. Alternatively, a copper concentrate can be added to the pressure oxidation 12, in which case the copper can be recycled after solvent extraction 50, 51 and stripping 49 or sent to electrowinning for the recovery of copper.

The raffinate 66 is subjected to a purification stage 500 to prepare a nickel/cobalt solution free from elements, such as iron, zinc and copper that cause problems in the subsequent process steps of solvent extraction and electrowinning of nickel and cobalt. If enough zinc is present in the concentrate, e.g. sufficient to produce at least 0.2 g/l zinc in the raffinate 66, the raffinate 66 can be subjected to a zinc solvent extraction 72 to reduce the amount of zinc going to the purification 500 and to obtain a concentrated zinc solution for electrowinning 80 and the production of a zinc metal product 82.

The purification stage 500 is a two stage counter-current precipitation step in which residual copper, iron and zinc are precipitated by the addition of slaked lime and recycled $Mg(OH)_2$.

Typically, the feed solution to the purification stage 500 will contain copper, zinc and iron, as well as magnesium and manganese. The precipitation is effected at a final pH of about 5 to 6 so that, ideally, no more than about 1 ppm zinc, 1 ppm copper and 1 ppm iron remain in the solution. The pH is controlled to counteract the precipitation of nickel and cobalt by not allowing the pH to rise too high and by carrying out the precipitation in two counter-current stages with a liquid/solid separation step in between. The first precipitation stage is carried out at a lowered pH of about 3 to 4. The solid from the second liquid/solid separation is recycled to the first precipitation to dissolve as much nickel/cobalt as possible at the lower pH. The recycled $Mg(OH)_2$ has also been found to be beneficial, making it easier to control pH.

The product from the purification stage 500 is subjected to a liquid/solid separation 502. The copper, iron and zinc hydroxides in the solid phase can be reprocessed by an acid wash or leach 503, particularly for nickel/cobalt recovery. The product from the acid wash 503 is subjected to a liquid/solid separation 505 leaving principally clean gypsum product 84 with a minimum metal content (0<0.1%). The liquid from the liquid/solid separation 505 is recycled to the pressure oxidation 12 for recovery of nickel/cobalt values and reprecipitation of iron as hematite.

The concentration of nickel, cobalt and magnesium in solution after the purification stage 500 will depend on the composition of the concentrate. Depending on the mineralogy, it is possible that most of the magnesium in the concentrate leaches during the pressure oxidation 12. Thus, for a nickel/cobalt concentrate containing say 20% nickel and 5% magnesium, the typical solution after the purification 500 will be about 30 g/l nickel and about 6 g/l magnesium. The magnesium content may be greater in the case of a laterite ore, depending on the type.

The solution resulting from the liquid/solid separation 502, is subjected to a selective precipitation step 506 in which nickel and cobalt are precipitated as hydroxides or carbonates with a suitable neutralization agent, such as slaked lime ($Ca(OH)_2$), soda ash ($Na_2CO_3$), ammonia ($NH_3$) or caustic soda (NaOH). This is effected at a pH of about 7 to 8, whilst minimizing the precipitation of $Mg(OH)_2$. A preferred neutralization agent is slaked lime due to its relatively low cost, and because the reaction does not introduce any new cations, such as $Na^+$ and $NH_4^+$, into the liquor.

Neutralization with Slaked Lime ($Ca(OH)_2$)

(1)

A similar reaction occurs with $CoSO_4$ and $MgSO_{4}$, producing $Co(OH)_2$ and $Mg(OH)_2$ respectively.

Neutralization with Caustic Soda (NaOH)

(2)

However, it is important to have a small amount of Mg present in the precipitated solid, which facilitates the separation of nickel and cobalt, as will be described below. A two-stage counter-current precipitation sequence has been found beneficial, (similar to that used for the purification 500), in order to prevent excessive precipitation of magnesium or excess loss of nickel/cobalt to the depleted solution.

In some circumstances, a precipitation with caustic soda or ammonia for instance that does not produce a solid byproduct (gypsum) is advantageous, so that the nickel precipitate is of a higher grade and free from calcium.

The product from the precipitation step 506 is subjected to a liquid/solid separation 508 and washing with fresh water to remove as much chloride from the solid as possible.

The liquid from the liquid/solid separation 508 is subjected to a precipitation step 510, at a higher pH, about pH 9–9.5 preferably again with slaked lime, for the same reasons as above, to precipitate additional magnesium, if needed, thereby to prevent accumulation of magnesium in the system. The product from the precipitation step 510 is subjected to a liquid/solid separation 512. The solid from the separation 512 is a magnesium hydroxide byproduct 514. As indicated above, some of the magnesium byproduct 514 is recycled for use in the purification 500, as well as the neutralization steps 64, 69. The liquid from the separation 512 is recycled as wash water for the liquid/solid separations 65, 71 and 502 and the excess may be discarded, as indicated at 73, or recycled back to the pressure oxidation 12 as a chloride source and to minimize water use.

The solid hydroxide cake from the separation step 508, containing the nickel and cobalt values, is subjected to a leach 518 with an ammonium solution at a pH of about 6 to 8, preferably pH 7–7.5, with minimal free ammonia, typically 0–10 g/l $NH_3$.

The ammonium solution may be ammonium sulphate or ammonium carbonate but the former has been found to be superior because it has a lower pH, thus allowing for better cobalt and nickel separation in solution. In addition, ammonium sulphate has a lower ammonia (gas) vapour pressure, and as well, the nickel/cobalt extractions are superior with ammonium sulphate. In the present example a 200 g/l ammonium sulphate solution is used.

The reactions which take place during the leach 518, in which soluble nickel and cobalt diammine sulphates are formed, are as follows:

(3)

(4)

The magnesium present in the solid also dissolves, as follows:

(5)

In carrying out the leach 518, it is not attempted to leach out 100% of the nickel/cobalt values in the solid but only about 90–99%. This enables the leach 518 to be carried out at a low pH rather than a higher pH of about 9 which would otherwise be required. This higher pH requires the addition of ammonia to the leach as a second reagent with the ammonium sulphate.

A further problem which arises is that the known or commercially available cobalt extractant does not function effectively at this high pH value. The extractant degrades and it is not selective against nickel. As a result, with a high pH it is necessary to effect nickel extraction first, rather than cobalt extraction, which would then require subsequently reducing the pH by the addition of a further reagent such as acid, which would in turn mean production of byproduct ammonium sulphate and consumption of the reagent ammonia. Another problem is that, in order to effect nickel solvent extraction first, it is necessary first to oxidize all the cobalt to the +3 oxidation state to avoid extraction of cobalt with nickel. This oxidation is difficult to achieve quantitatively. This, therefore, results in further process complications. Also it is necessary to reduce the $Co^{3+}$ back to $Co^{2+}$ following nickel extraction and this is equally difficult to achieve.

To avoid the above difficulties, the process according to the present invention provides effecting the leach 518 at a pH of about 6 to about 8, and preferably about pH 7–8.

A further aspect of the process is that the percentage of solids in solution during the leach 518 is kept sufficiently low. Although the solids content may be up to 10%, a value of 5% is preferred. The concentration of nickel in solution is maintained at about 5–20 g/l, and preferably 10 g/l maximum. It has been found that this results in better nickel recovery during the leach 518.

The product from the leach 518 is subjected to liquid/solid separation 522.

The solid product from the liquid/solid separation 522 is subjected to a washing step 520 where the solid is washed with ammonium sulphate solution. This is a weak ammonium sulphate solution of about 10% of the concentration of the solution of the leach 518. It results from the washing of entrained ammonium sulphate solution from the solid in the washing step 524.

The product from the washing step 520 is subjected to the liquid/solid separation 524 and the solid is washed with water as indicated at 525. The wash water and liquid from the liquid/solid separation 524 is recycled to the leach 518 via an evaporator 539. However, there is a bleed 533 to recycle part of the liquid from the liquid/solid separation 524 to the leach 520, as referred to above.

To compensate for the water added during the wash 525, there is a bleed of the final raffinate to the strong ammonium sulphate raffinate 610 coming from the nickel solvent extraction 538. For this purpose, the strong ammonium sulphate circuit includes the evaporator 539 to compensate for the raffinate bleed from the weak ammonium sulphate raffinate. The evaporator 539, which may be any type of suitable commercially available evaporator, reduces the water content by the evaporation of water to produce a more concentrated solution. Steam is discharged by the evaporator 539, as indicated at 541.

The liquid from the separation 522 is subjected to a cobalt solvent extraction 534 to provide a cobalt loaded extractant 600 and a raffinate 602 which is then subjected to a magnesium solvent extraction 536 to recover the remaining cobalt in the raffinate 602, along with magnesium. This provides a cobalt and magnesium loaded extractant 604 and a raffinate 606 which is subjected to nickel solvent extraction 538 to provide a nickel loaded extractant 608 and raffinate 610.

The cobalt solvent extraction 534 and the magnesium solvent extraction 536 are both operated with the same type of extractant, but comprise separate streams, as indicated. The concentration of the extractant may also be different in the separate streams.

An extractant which has been found to be suitable for both cobalt and magnesium extraction is an organic phosphorous acid extractant, such as Cyanex 272™, of Cyanamid Inc., which comprises bis 2, 4, 4–trimethylpentyl phosphinic acid. The extractant is more selective for cobalt than for magnesium, and more selective for magnesium than for nickel. During the cobalt solvent extraction 534, the amount of extractant used is limited to occupy all the available sites with cobalt ions, to a major extent, and with magnesium ions, to a lesser extent, which counteracts the extraction of nickel. During the magnesium solvent extraction 536, the available sites are filled with mainly magnesium ions and, to a lesser extent, with some cobalt ions and possibly also a small amount of nickel ions. The nickel and cobalt ions are then recovered by the recycle of the magnesium pregnant liquor to the Ni/CO precipitation 506 (not shown).

For good separation of cobalt from nickel during the cobalt solvent extraction 534 and the nickel solvent extraction 538, it has been found beneficial to have some magnesium present in the solution feed to the cobalt solvent extraction 534. Typically, the solution has the same ratio of cobalt to nickel as found in the original feed concentrate (commonly 1:30). Thus for 10 g/l Ni, 0.33 g/l Co is typical.

It has been found beneficial to maintain a magnesium concentration about equal to the cobalt concentration in the feed to the cobalt solvent extraction 534, although this may vary quite widely from say 1:5 to 5:1.

The benefit of having magnesium present is that:
(i) it minimizes the amount of nickel that is extracted during cobalt solvent extraction, whilst,
(ii) allowing a high percentage of cobalt extraction, i.e., greater than 90%, and
(iii) a high cobalt to nickel ratio in the cobalt product, i.e., Co: Ni>1000:1.

Without magnesium present, some compromise must be reached in the cobalt solvent extraction, whereby
(i) some nickel is co-extracted with cobalt, or
(ii) the cobalt extraction is incomplete, or
(iii) the cobalt to nickel ratio in the cobalt product is too low.

With magnesium present, some cobalt (i.e. 5–10%) can be left un-extracted during the cobalt solvent extraction 534 and instead will be extracted during the magnesium solvent extraction 536. The products of magnesium solvent extraction 536 are:
(a) Pregnant liquor from stripping containing some magnesium, nickel and cobalt, which is recycled and not lost; and
(b) Magnesium raffinate 606 with very low cobalt levels, i.e. about 1 ppm, which allows the subsequent nickel solvent extraction 538 to produce a very good nickel to cobalt ratio in the nickel pregnant liquor 642 going to nickel electrowinning 532. Thus, very pure nickel cathodes and cobalt cathodes result.

A reducing agent, such as sodium metabisulphate, is added in the cobalt solvent extraction 534 to counteract oxidation of cobalt from $Co^{2+}$ to $Co^{3+}$ $Co^{3+}$ is not extracted in the solvent extraction 534 and will therefore be present in the nickel solvent extraction 538.

Since the oxidation of $Co^{2+}$ to $Co^{3+}$ also catalyses oxidation of the kerosene which is generally used as diluent, in the cobalt solvent extraction 534, an anti-oxidant, such as butyl-hydroxytoluene (BHT), is added to the Cyanex 272™ to counteract oxidation of the diluent to carboxylic acid which will result in the oxidation of nickel in the cobalt solvent extraction 534.

The cobalt loaded extractant 600 is subjected to a controlled stripping operation. This is effected by controlling the pH during stripping. First the extractant 600 is stripped at pH 3.5 to remove the cobalt, as shown at 612, to provide a pregnant liquor 614 which goes to cobalt electrowinning 530. In this way a pregnant liquor at the desired pH is provided so that cobalt electrowinning can proceed effectively.

The cobalt is recovered as a cobalt cathode which is subjected to washing 616 to result in a cobalt metal product 618. The spent electrolyte 620 from the electrowinning 530 is recycled as strip solution to the cobalt stripping 612.

After the cobalt stripping 612, the resulting cobalt depleted extractant 622 is subjected to a strong acid strip 624, to remove impurities, e.g. manganese, iron, zinc and copper, from the extractant 622 which are more strongly loaded onto the extractant than cobalt. This is effected by the addition of acid and water as indicated at 626 so that about 10 g/l free acid ($H_2SO_4$) remains in the aqueous solution after stripping. The resulting stripped organic 628 is then recycled to the cobalt solvent extraction 534.

Hydrochloric acid (HCl) is used to effect stripping 630 of the loaded organic 604 after the magnesium solvent extraction 536. The HCl and water are added as indicated at 632. The resulting stripped extractant 634 is recycled to the magnesium solvent extraction 536, while the stream of acid and impurities 636 is combined with the stream 638 of acid and impurities from the stripping 624 and recycled to the strong acid leach 503.

The raffinate 602 from the cobalt solvent extraction 534 still contains about 10% cobalt in addition to other elements, such as calcium, along with magnesium and nickel. In fact, the amount of calcium present is normally greater than the amount of cobalt present. An excess of extractant is used in the solvent extraction 536 to facilitate the removal of cobalt along with the magnesium. This also results in the removal of calcium during the solvent extraction 536. Using HCl instead of $H_2SO_4$ in the stripping 630 avoids the production of gypsum ($CaSO_4 \cdot 2H_2O$). Instead, chlorides are produced which are recycled in the stream 636 to the acid leach 503, as indicated above and from there recycled to the pressure oxidation 12, as indicated at 504. This recycle constitutes the main chloride feed to the pressure oxidation 12.

For nickel extraction, a hydroxy-oxime based extractant, such as LIX 84™, of by Henkel Corp, has been found to be suitable.

The loaded organic extractant 608 from the nickel solvent extraction 538 is subjected to stripping with spent electrolyte from the nickel solvent extraction, as shown at 640 to produce a pregnant liquor 642 that goes to nickel electrowinning 532. The exhausted electrolyte 644 is recycled as stripping solution to the stripping 640. The nickel is recovered as a nickel cathode which is subjected to washing 646 to result in a nickel metal product 648.

The stripping 640 may be carried out in two or more stages, preferably four stages, to facilitate reduction of the nickel concentration in the resultant stripped extractant 650. The stripped extractant 650 is recycled to the nickel solvent extraction 538, but a bleed is subjected to a further stripping 652 with HCl. The resulting stripped organic 654 is also recycled to the nickel solvent extraction 538, while the stream of acid and impurities 656 is combined with the streams 636 and 638 and recycled to the aid leach 503.

The respective cobalt, magnesium and nickel loaded extractants 600, 604, 608 are scrubbed with suitable aqueous solutions (not shown) to remove entrained ammonium sulphate solution and then stripped (612, 630, 640) with dilute acid to produce pure pregnant solutions of cobalt and nickel, as well as a magnesium pregnant liquor containing small amounts of cobalt and nickel. The cobalt and nickel solutions are sent to the cobalt and nickel electrowinning stages 530 and 532, respectively, as indicated above.

Prior to stripping 612, the cobalt loaded extractant is scrubbed with a cobalt concentrate solution (not shown) which is split off from the cobalt pregnant solution 614 going to the cobalt electrowinning 530 and/or a magnesium concentrate solution (not shown) which is split from the magnesium pregnant liquor. This is to facilitate the removal of nickel values which may be present in the cobalt loaded extractant.

A suitable temperature range for the nickel/cobalt leach 518 and nickel/cobalt solvent extraction has been found to be about 30° C. to 60° C., preferably about 40° C. to about 50° C.

Figure 5:
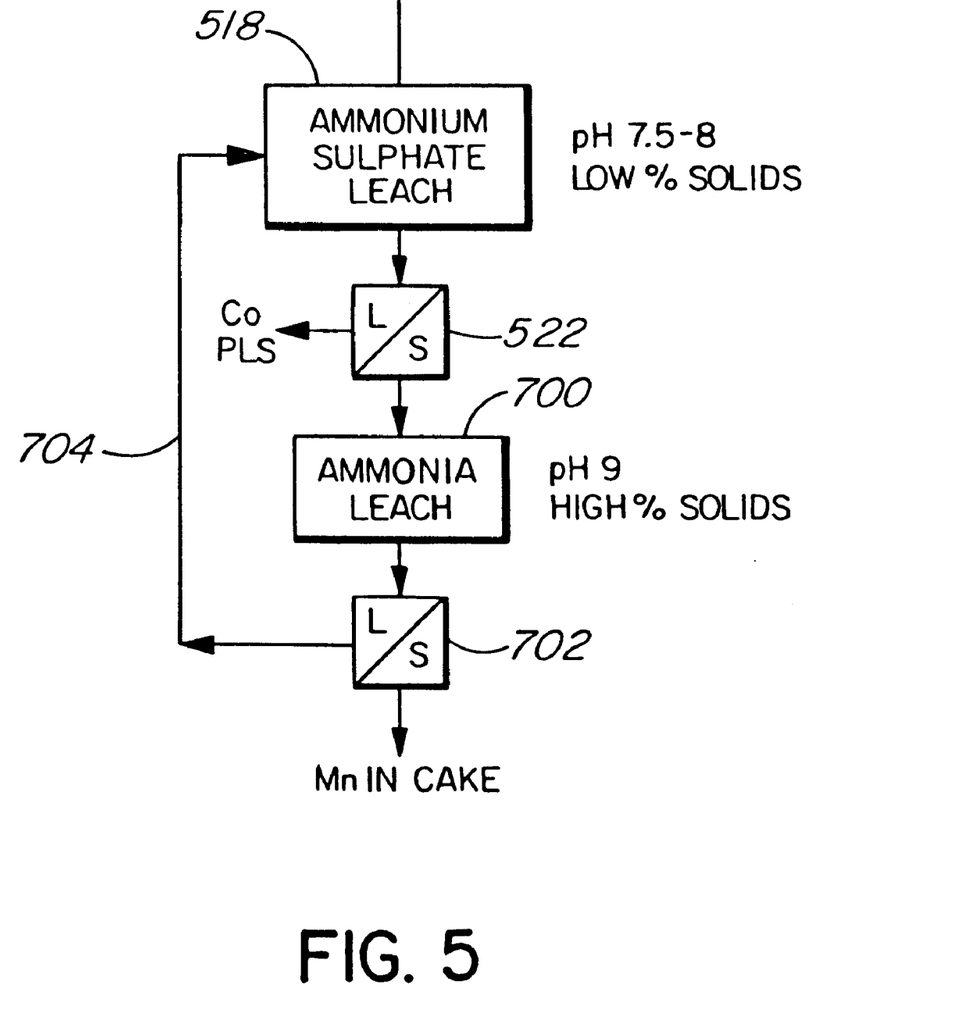
FIG. 5 is a flow diagram showing detail of the process of FIG. 1 for the treatment of laterite ores.

In the case of a laterite ore, the pressure oxidation 12 is replaced by an acid ($H_2SO_4$) leach under pressure at a pH of 1 or less and at a temperature of from about 250° C. to about 280° C.

The copper solvent extraction can also be carried out in the case of a laterite ore. Although this may not be necessary if only very small amounts of copper are present, in which case the copper can be removed in the controlled stripping during the strong acid strip 624.

Laterite ores contain significant amounts of manganese, chromium, aluminum and magnesium, which must be removed during the process. The latter three are removed, along with the iron, during the purification stage 500. In order to achieve this, the temperature is maintained at 95° C.–100° C. during the purification stage 500. However, some magnesium remains in solution after the purification 500, as indicated earlier, which is desirable in respect of the cobalt and nickel solvent extractions as described.

The manganese precipitates with the nickel and cobalt during the precipitation step 506. However, since manganese does not form diammines or only forms very weak complexes with ammonia, it is not dissolved appreciably during the ammonium leach 518. It therefore remains largely in the solid residue after the liquid/solid separation 522, with typically only about 5 to 10 ppm manganese in solution. This small amount which is present in the solution is removed during the strong acid strip 624.

The liquid from the liquid/solid separation 522 goes to the cobalt solvent extraction, as in FIG. 1.

In order to remove the manganese from the system, the ammonium leach 518 is followed by a leach 700 with a strong ammonia solution (e.g. 20 g/l or higher) so that the pH is about 9 to 9.5. The leach 518 is carried out with a high percentage solids of about 5% to about 25%, preferably about 15% to minimize the amount of free acid the percentage solid is maintained as high as possible.

The ammonia leach 700 is exacerbated by high temperature and is therefore carried out at a low as possible temperature (e.g. about 25° C. to about 40° C.) to thereby minimize the volatilization of the ammonia.

The leach 700 is in place of the weak ammonium leach 520 of FIG. 1 for the treatment of sulphide ores or concentrates.

The leach 700 is followed by a liquid/solid separation 702. The liquid from the liquid/solid separation 702 is recycled to the ammonium leach 518 as indicated at 704.

The solid from the liquid/solid separation 702 contains the manganese and can be disposed of.

The solids from the liquid/solid separations 65 and 71 are also subjected to the strong acid leach 503, to recover any remaining metal values. The acid from the stripping 49 is used for carrying out the strong acid leach 503.

The cobalt electrowinning 530 and the nickel electrowinning 532 are both carried out in diaphragm cells. This is to counteract protons produced at the anode during electrowinning from migrating to cathode where the metal (nickel or cobalt) is produced, otherwise hydrogen gas will be produced at the cathode instead. Therefore, the pregnant liquor feed to the cathode is maintained at about pH 3 and a head of liquid is maintained on the cathode sides over the anode, so that the resulting higher pressure on the cathode side will further counteract the migration of protons into the cathode compartment.

While only preferred embodiments of the invention have been described herein in detail, the invention is not limited thereby and modifications can be made within the scope of the attached claims.

What is claimed is:

1. A process for the extraction of metal from an ore or concentrate, containing nickel and/or cobalt values and other metals, comprising the steps of:

subjecting the ore or concentrate to acid leaching under pressure, at pH≦2, to obtain a liquor containing nickel and/or-cobalt values in addition to non-nickel and non-cobalt metals;

subjecting the liquor to a first precipitation stage at a pH of about 5 to 6 to produce a solid containing the non-nickel and non-cobalt metals and a resultant solution containing the nickel and/or cobalt values;

subjecting the resultant solution to a second precipitation stage at a pH of about 7 to 8 to produce a solid containing nickel and/or cobalt and a nickel and cobalt depleted liquor, wherein said acid leaching under pressure comprises pressure oxidation in the presence of oxygen and an acidic solution containing halide and sulphate ions.

2. The process according to claim 1, further comprising the steps of subjecting the solid containing nickel and/or cobalt to an ammonium leach with an ammonium solution at a pH of about 6 to 8 to produce a leach solution containing nickel in solution and a solid residue.

3. The process according to claim 2, further comprising the step of maintaining the percentage solids in solution during the ammonium leach at a maximum value of about 10%.

4. The process according to claim 3, wherein said maximum value is about 5%.

5. The process according to claim 3, wherein the concentration of nickel in solution during the ammonium leach is maintained at a value of from about 5 g/l to about 20 g/l.

6. The process according to claim 5, wherein the nickel concentration is maintained at a value of about 10 g/l.

7. The process according to claim 2, wherein the ore is a laterite ore and further comprising the step of subjecting the solid residue from the ammonium leach to an ammonia leach with an ammonia solution at a pH of about 9 to about 9.5 to produce a liquid which is recycled to the ammomium leach and a manganese containing solid.

8. The process according to claim 1, further comprising the steps of subjecting the solid containing nickel and/or cobalt to an ammonium leach with an ammonium solution at a pH of about 6 to 8 to produce a leach solution containing nickel and cobalt in solution and a solid residue.

9. The process according to claim 8, further comprising the steps of:
subjecting the leach solution to cobalt solvent extraction in the presence of magnesium ions to provide a cobalt loaded extractant and a first raffinate;
subjecting the first raffinate to a magnesium solvent extraction to provide a magnesium loaded extractant and a second raffinate; and
subjecting the second raffinate to nickel solvent extraction to provide a nickel loaded extractant and a third raffinate.

10. A process according to claim 9, wherein the magnesium loaded extractant is recycled to the second precipitation stage.

11. The process according to claim 9, wherein a reducing agent is added in the cobalt solvent extraction to counteract oxidation of $Co^{2+}$ to $Co^{3+}$.

12. The process according to claim 9, wherein an antioxidant is added in the cobalt solvent extraction.

13. The process according to claim 9, wherein the cobalt loaded extractant is subjected to a first stripping at a pH of about 3 to 3.5 to provide a cobalt pregnant liquor and a cobalt depleted extractant and subjecting the cobalt depleted extractant to a second stripping at a higher pH to produce a liquor containing non cobalt metals and a stripped extractant.

14. The process according to claim 9, wherein the cobalt loaded and the nickel loaded extractants are subjected to electrowinning in diaphragm cells to produce cobalt and nickel.

15. The process according to claim 1 wherein the acid leaching is-effected at a pH $\leq 1$.

16. The process according to claim 1, wherein the halide is selected from the group consisting of chloride and bromide.

17. The process according to claim 1, wherein the halide is chloride.

18. The process according to claim 17, wherein the concentration of the chloride in the acidic solution is from about 8 g/l to about 20 g/l.

19. The process according to claim 18, wherein the chloride concentration is about 12 g/l.

20. The process according to claim 1, wherein the pressure oxidation is effected at a pH of from about 1.5 to about 1.

21. The process according to claim 1, wherein the acid leaching is carried out at a temperature of from about 250° C. to about 280° C.

22. The process according to claim 1, wherein the pressure oxidation is effected at a temperature from about 120° C. to about 175° C.

23. The process according to claim 22, wherein the temperature is from about 130° C. to about 160° C.

24. The process according to claim 1, wherein the pressure oxidation is effected under an oxygen partial pressure between about 50 psig to about 100 psig.

25. The process according to claim 1, wherein the liquor resulting from the pressure oxidation also contains copper and further comprising the step of subjecting the liquor to copper solvent extraction prior to said first precipitation stage to produce a copper solution and a copper depleted raffinate and subjecting the raffinate to the first precipitation stage.

26. The process according to claim 25, wherein the copper solvent extraction is effected in two stages with a neutralization step interposed between the stages.

27. The process according to claim 25, wherein the copper solution is subjected to electrowinning to produce a solid copper product and a resulting exhausted electrolyte.

28. The process according to claim 27, wherein the solvent extraction is effected by means of an organic copper extractant to produce a copper loaded extractant and further comprising the steps of stripping the copper loaded extractant to produce a stripped extractant and recycling the stripped extractant to the copper solvent extraction.

29. The process according to claim 28, wherein the stripping of the copper loaded extractant is effected by means of the spent electrolyte which is recycled from the copper electrowinning.

30. The process according to claim 1, wherein a source of copper is added to the pressure oxidation.

31. The process according to claim 30, wherein the source of copper is selected from a copper salt and a copper ore or concentrate.

32. The process according to claim 25, wherein the copper solution is recycled to the pressure oxidation.

33. The process according to claim 1, wherein the liquor resulting from the pressure oxidation also contains zinc and further comprising
the step of subjecting the liquor to zinc solvent extraction prior to said first precipitation stage to produce a zinc solution and a zinc depleted raffinate and subjecting the raffinate to the first precipitation stage.

34. The process according to claim 1, wherein the first precipitation stage comprises a first precipitation step which is carried out at a pH of about 3 to 4 to produce a first solid and a first liquid; and
subjecting the first liquid to a second precipitation step at a pH of about 5 to 6 to produce the solid containing the non-nickel and non-cobalt metals and the resultant solution containing the nickel and cobalt values.

* * * * *